(12) United States Patent
Matsuki et al.

(10) Patent No.: US 7,811,511 B2
(45) Date of Patent: Oct. 12, 2010

(54) PARTICLE DISPERSION COPPER ALLOY AND METHOD FOR PRODUCING THE SAME

(75) Inventors: Shogo Matsuki, Utsunomiya (JP); Yositaka Tsujii, Shioya-gun (JP)

(73) Assignee: Hondo Motor Co., Ltd., Tokyo (JP)

( * ) Notice: Subject to any disclaimer, the term of this patent is extended or adjusted under 35 U.S.C. 154(b) by 0 days.

(21) Appl. No.: 12/650,647

(22) Filed: Dec. 31, 2009

(65) Prior Publication Data

US 2010/0104466 A1   Apr. 29, 2010

Related U.S. Application Data

(62) Division of application No. 11/506,782, filed on Aug. 21, 2006, now Pat. No. 7,666,246.

(30) Foreign Application Priority Data

Sep. 13, 2005   (JP)   ............... 2005-265350

(51) Int. Cl.
  *B22F 7/00*   (2006.01)
  *B22F 5/00*   (2006.01)
  *C21B 11/10*  (2006.01)
  *C21B 13/12*  (2006.01)
  *C21C 5/52*   (2006.01)
  *C21C 5/54*   (2006.01)
  *C22B 4/00*   (2006.01)
  *C22B 9/22*   (2006.01)
  *C22F 1/08*   (2006.01)
  *C21D 1/00*   (2006.01)

(52) U.S. Cl. ............ 419/6; 75/10.13; 75/10.19; 148/513; 148/536; 148/565

(58) Field of Classification Search ... 123/188.1–190.9; 75/228, 230, 236–247, 255, 252, 254, 10.1, 75/10.13, 10.19; 148/513, 514, 516, 524, 148/525, 527, 536, 565, 674, 679, 408, 411–414, 148/425, 432–436, 442, 903; 419/5–18, 419/23, 66; 420/435–440, 469–500, 580–590; 428/570; C22C 1/04, 1/05, 1/10, 19/07, C22C 32/00; C22F 1/00, 1/08; B22F 1/00, B22F 5/00; B23K 35/30, 9/04
See application file for complete search history.

(56) References Cited

U.S. PATENT DOCUMENTS

| | | | | |
|---|---|---|---|---|
| 4,372,783 A * | 2/1983 | Kato | .................... | 75/246 |
| 4,935,056 A * | 6/1990 | Miyasaka | .................... | 75/231 |
| 5,125,962 A * | 6/1992 | Krentscher | .................... | 75/247 |
| 5,207,821 A * | 5/1993 | Ikenoue et al. | .................... | 75/247 |
| 5,843,243 A | 12/1998 | Kawasaki et al. | | |
| 2001/0001641 A1 | 5/2001 | Ninomiya et al. | | |
| 2008/0083391 A1* | 4/2008 | Sawada et al. | .................... | 123/188.8 |

FOREIGN PATENT DOCUMENTS

| | | |
|---|---|---|
| DE | 699 09 812 T2 | 6/2004 |
| EP | 0 320 195 A1 | 6/1989 |
| EP | 1 120 472 B1 | 7/2003 |
| JP | 49-011979 A | 3/1974 |
| JP | 03-060895 A | 3/1991 |
| JP | 03-068729 A | 3/1991 |
| JP | 2001-105177 A | 4/2001 |
| JP | 2002-194462 A | 7/2002 |
| JP | 3373076 | 11/2002 |
| WO | WO-2005/059190 A1 | 6/2005 |

OTHER PUBLICATIONS

Computer-generated translation of JP 2001-105177.*
Estimation of Carbon in Copper Alloy for EP 0 320 195.

* cited by examiner

*Primary Examiner*—Scott Kastler
*Assistant Examiner*—Vanessa Velasquez
(74) *Attorney, Agent, or Firm*—Arent Fox LLP

(57) ABSTRACT

Hard phase particles including Co alloy particles, carbide alloy particles, and silicide particles are dispersed substantially uniformly throughout a matrix composed of Cu self-fluxing alloy of a cladded portion. The cladded portion contains 6 to 15% by weight of Co, 3 to 8% by weight of one of Cr and Mo, 0.3 to 1% by weight of W, 0.5 to 1.8% by weight of Fe, 8 to 15% by weight of Ni, 0.08 to 0.2% by weight of C, 1.5 to 4% by weight of Si, 0.5 to 0.8% by weight of Al, and 0.1 to 0.3% by weight of P, and inevitable impurities and Cu as a balance. The hard phase particles have an average particle diameter of 8 to 20 μm and a particle size distribution width of 0.1 to 100 μm, and to occupy 10 to 20% in an arbitrary cross section of the cladded portion.

6 Claims, 3 Drawing Sheets

PARTICLE DISPERSION COPPER ALLOY AND METHOD FOR PRODUCING THE SAME

BACKGROUND OF THE INVENTION

1. Field of the Invention

The present invention relates to a particle dispersion copper alloy in which particles are dispersed in a matrix composed of a copper alloy, and a method for producing the same.

2. Description of the Related Art

The combustion gas is produced in accordance with the reciprocating motion of a piston in a cylinder bore in an internal combustion engine of an automobile. A discharge port is provided for the internal combustion engine in order to discharge the combustion gas. The discharge port is opened/closed by a valve.

A valve seat is provided for the discharge port in order to seal the combustion gas. The valve, which makes the forward/backward movement in accordance with the opening/closing operation of the discharge port, makes sliding contact with the valve seat. Therefore, it is desired that the valve seat is excellent in the abrasion resistance.

A seat made of Fe-based sintered material or a seat made of copper-based self-fluxing alloy has been hitherto adopted as the valve seat. Such a valve seat is arranged for the cylinder bore as follows. In the case of the seat made of Fe-based sintered material, an annular member is manufactured, and forcibly introduced under the pressure. On the other hand, in the case of the seat made of copper-based self-fluxing alloy, cladding (or padding) is carried out in the vicinity of an opening of the cylinder bore.

In recent years, environmental protection has been highly concerned. Therefore, further clean gas discharge from the internal combustion engine and reduced fuel consumption ratio have been attempted. In accordance with such attempt, the ratio of fuel to the air is decreased when fuel is combusted in the internal combustion engine. In other words, the fuel becomes thinned. However, when the combustion method as described above is carried out, the known seats made of Fe-based sintered material or copper-based self-fluxing alloy are undesirably worn in a relatively short period of time.

In order to improve abrasion resistance of the seat made of the copper-based self-fluxing alloy, for example, it is preferable to disperse hard particles in the copper-based self-fluxing alloy. From this viewpoint, Japanese Laid-Open Patent Publication No. 2001-105177 suggests that a silicide having a three-dimensional Laves structure is dispersed as hard particles in a copper-based self-fluxing alloy.

In the case of this technique, the average particle diameter of the hard particles ranges over 50 to 200 μm. In the case of the particle-dispersed copper alloy containing the coarse particles as the hard particles as described above, the surface roughness is excessively increased. Frictional heat may undesirably be increased when the valve makes sliding contact.

On the other hand, Japanese Patent No. 3373076 and Japanese Laid-Open Patent Publication No. 2002-194462 disclose the fact that a silicide is crystallized or deposited from a component which constitutes a copper alloy, and provided as hard particles. However, in this case, because the hard particles may not be dispersed uniformly, it is difficult to uniformize abrasion resistance throughout the seat.

SUMMARY OF THE INVENTION

A general object of the present invention is to provide a particle dispersion copper alloy in which hard particles are dispersed substantially uniformly.

A principal object of the present invention is to provide a particle dispersion copper alloy in which the surface roughness is sufficiently small as well.

Another object of the present invention is to provide a method for producing the particle dispersion copper alloy as described above.

According to one aspect of the present invention, there is provided a particle dispersion copper alloy comprising particles dispersed in a matrix composed of a copper alloy;

the particle dispersion copper alloy containing 6 to 15% by weight of Co, 3 to 8% by weight of at least any one of Cr and Mo, 0.3 to 1% by weight of W, 0.5 to 1.8% by weight of Fe, 8 to 15% by weight of Ni, 0.08 to 0.2% by weight of C, 1.5 to 4% by weight of Si, 0.5 to 0.8% by weight of Al, 0.1 to 0.3% by weight of P, and inevitable impurities and Cu as balance, wherein:

the particles have an average particle diameter of 8 to 20 μm and a particle size distribution width of 0.1 to 100 μm, and an area ratio occupied by the particles in an arbitrary cross section is 10 to 20%.

In the present invention, the hard phase particles occupy the area ratio of 10 to 20% in an arbitrary cross section. That is, the hard phase particles are dispersed substantially uniformly in the matrix. Therefore, the hardness is substantially uniform throughout the alloy. When hardness is high, abrasion resistance is also excellent. Consequently, the abrasion resistance is satisfactory and uniform throughout the alloy.

Further, because the average particle diameter and the particle size distribution width are within the predetermined ranges, increase in the surface roughness is also avoided.

Because the particles (hard phase), which include the predetermined components at the predetermined composition ratio, are dispersed in the Cu alloy, and the average particle diameter of the particles, the particle size distribution width, and the occupied area ratio in an arbitrary cross section are set to be within the predetermined ranges as described above, the hard phase particles, which are relatively fine and minute, are dispersed substantially uniformly in the matrix. Accordingly, it is possible to obtain a particle dispersion copper alloy throughout which abrasion resistance is satisfactory and substantially uniform.

Further, in the present invention, the occupied area ratio of the particles is increased by about 10 to 40% as compared with a known particle dispersion copper alloy. When the occupied area ratio of the hard particles is increased as described above, abrasion resistance is improved as well.

According to another aspect of the present invention, there is provided a method for producing a particle dispersion copper alloy comprising particles dispersed in a matrix composed of a copper alloy, wherein an area ratio occupied by the particles in an arbitrary cross section is 10 to 20%, the method comprising the steps of:

preparing a mixed powder by mixing a Cu alloy powder and Co alloy powder at a weight ratio between the Cu alloy powder and the Co alloy powder as 99 to 85:1 to 15, the Cu alloy powder having a particle size of 10 to 150 μm and containing 6 to 12% by weight of Ni, 2 to 5% by weight of Si, 1 to 10% by weight of at least any one of Cr and Mo, 2 to 10% by weight of Co, 0.3 to 1% by weight of Al, 0.3 to 1.2% by weight of P, 0.5 to 1.5% by weight of Fe, and inevitable impurities and Cu as balance, and the Co alloy powder having a particle size of 10 to 150 μm and containing 20 to 35% by weight of at least any one of Cr and Mo, 1 to 3% by weight of Ni, 1 to 2.5% by weight of Si, 3 to 8% by weight of W, 1 to 3% by weight of Fe, 0.8 to 2% by weight of C, and inevitable impurities and Co as balance; and heating the mixed powder by means of laser or plasma to prepare a particle dispersion copper alloy.

When the steps as described above are performed, it is possible to easily and simply obtain the particle dispersion copper alloy as described above. In particular, because laser or plasma which permeates into the mixed powder is used, it is possible to easily advance dissolution of mixed powder and matrix formation of Cu alloy powder.

The mixed powder may be heated on a metal member. In this procedure, the particle dispersion copper alloy is formed in a state of being joined to the metal member. In other words, a cladded portion is formed.

The material of the metal member is not specifically limited, but may be an Al alloy as a preferred example.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The particle dispersion copper alloy and the method for producing the same according to the present invention will be explained in detail below with reference to the accompanying drawings as exemplified by preferred embodiments.

Figure 1:
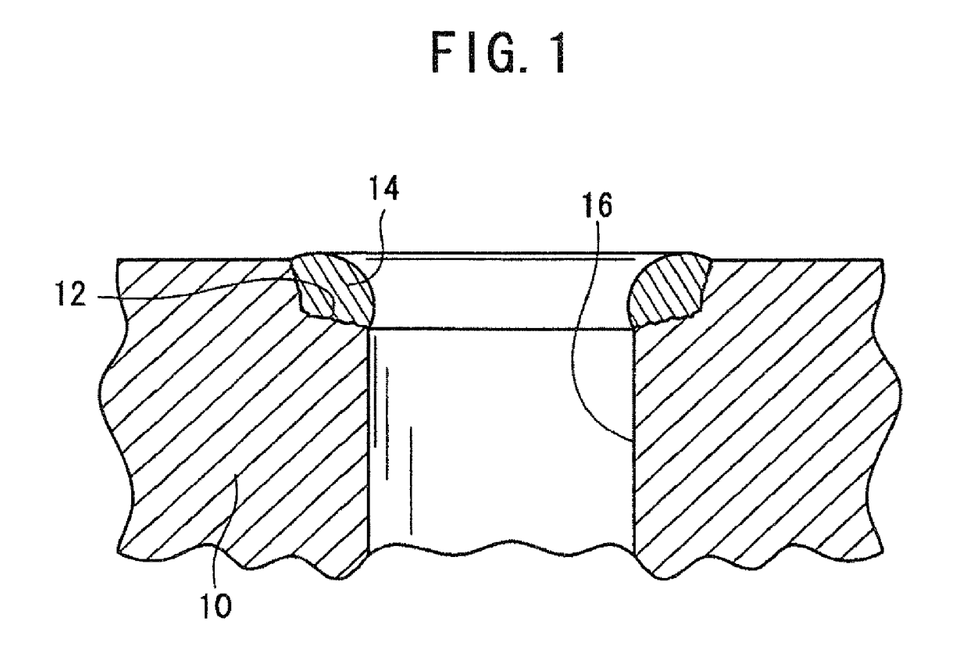
FIG. 1 is a magnified sectional view illustrating main parts to depict a state in which a cladded portion composed of a particle dispersion copper alloy according to an embodiment of the present invention is provided on a depressed portion of an Al alloy member.

FIG. 1 shows a magnified sectional view illustrating main parts to depict a state in which a cladded portion 14 is provided on a depressed portion 12 of an Al alloy member 10. In this embodiment, the cladded portion 14 is formed of a particle dispersion copper alloy.

The depressed portion 12 is provided as an annular stepped portion to expand the diameter in the vicinity of the opening of a through-hole 16. Therefore, in this arrangement, the cladded portion 14 has an annular shape.

Particles as the hard phase are dispersed substantially uniformly in a Cu alloy as a matrix in the cladded portion 14, i.e., in the particle dispersion copper alloy according to the embodiment of the present invention. That is, the cladded portion 14 has high hardness by the particles. The particles are principally composed of $Cr_2C_3$. Particles of, for example, other carbides, alloys, and silicides are also present.

The components of the cladded portion 14 and the ratios thereof are 6 to 15% by weight of Co, 3 to 8% by weight of at least any one of Cr and Mo, 0.3 to 1% by weight of W, 0.5 to 1.8% by weight of Fe, 8 to 15% by weight of Ni, 0.08 to 0.2% by weight of C, 1.5 to 4% by weight of Si, 0.5 to 0.8% by weight of Al, and 0.1 to 0.3% by weight of P, and the balance including inevitable impurities and Cu. That is, for example, the composition ratio of Cr represents the composition not only of the matrix, but also in the matrix and all particles. The same is true of the other components described above.

One of Cr and Mo or the combination thereof may be contained. When the both are contained, the total of Mo and Cr may be 3 to 8% by weight in total. Preferably, Mo is 0.3 to 1% by weight, and the balance is Cr.

Co serves as the component of nucleation to deposit the hard phase (particles). If Co is less than 6%, the effect to improve hardness is poor, because the particles are excessively fine and minute. On the other hand, if Co exceeds 15%, hardness is excessively increased, because the particles become excessively coarse. A member, which makes sliding contact with the cladded portion 14, is quickly abraded. Cracking may occur during cladding.

Cr or Mo principally exists in a state of carbide as a result of the reaction with C, which serves as nucleation to deposit the hard phase in the same manner as Co. Cr and Mo singly improve heat resistance and abrasion resistance of the cladded portion 14. If Cr or Mo is less than 3% by weight, sufficient effect is not obtained. On the other hand, if Cr or Mo exceeds 8% by weight, hair cracks tend to occur in the cladded portion 14 during cladding. Further, dispersion state of the hard phase particles easily tends to be uneven.

W improves abrasion resistance of the cladded portion 14 and suppresses hair cracks. If W is less than 0.3% by weight, it is difficult to obtain these effects. On the other hand, if W exceeds 1% by weight, dispersion of the hard phase particles tends to be uneven.

Fe is a component, which provides the particles with high hardness. In particular, when Fe forms a ferroalloy, this effect is excellent. Because Fe is relatively inexpensive, it is possible to improve hardness of the cladded portion 14 at a low cost.

Ni is a component which affects self-fluxing property during cladding and adhesive wear of a member which makes sliding contact with the cladded portion 14. That is, if the total ratio of Ni in the Cu alloy powder and the Co alloy powder described later on is less than 8% by weight, the self-fluxing properties of the both alloy powders are insufficient during cladding. On the other hand, if Ni exceeds 15% by weight, it is likely for a member, for example, a valve, which makes sliding contact with the cladded portion 14, to cause the adhesive wear.

C forms a carbide together with a part of Cr or Mo, and thus C exists as deposited hard particles. That is, C contributes to increase hardness of the cladded portion 14, and it consequently contributes to the improvement in abrasion resistance. If C is not more than 0.08% by weight, this effect is not sufficient. If C exceeds 2% by weight, because hardness of the cladded portion 14 is excessively increased, the member, which makes contact with the cladded portion 14, tends to be abraded.

Si functions to express the self-fluxing property. Further, a part of Si exists as a silicide provides the cladded portion 14 with high hardness. If Si is less than 1.5% by weight, then the self-fluxing property is not expressed sufficiently, and the amount of silicide is insufficient. On the other hand, if Si exceeds 4% by weight, because a grain boundary deposition amount of silicide is excessively increased, hair cracks tend to occur during cooling after cladding.

Al is a component to express self-fluxing property. Further, Al contributes to increase hardness of the cladded portion 14. If Al is less than 0.5% by weight, hardness of the cladded portion 14 is insufficient. On the other hand, if Al exceeds 0.8% by weight, hair cracks tend to occur in the cladded portion 14.

P is a component which lowers viscosity of the molten metal when alloy powder is prepared so that atomize powder is formed with ease. That is, P plays a role of so-called flux which reduces an alloy surface and which lowers the melting point of the oxide. If P is less than 0.1% by weight, this effect is insufficient. On the other hand, if P exceeds 0.3% by weight, cracks may be caused during solidification. P is also a component to express the self-fluxing property.

In the cladded portion 14 as described above, the average particle diameter of the hard particles is set to within a range of 8 to 20 μm. The particle size distribution width thereof is 0.1 to 100 μm. When the average particle diameter and the particle size distribution width are set to within the ranges as described above, the surface roughness of the cladded portion 14 is decreased as well. Therefore, it is possible to suppress abrasion of the member which makes contact with the cladded portion 14.

If the particle size is less than 0.1 μm, abrasion resistance of the cladded portion 14 is not improved so much although it is necessary to make the particle diameter of the starting raw material to be fine and minute, which is disadvantageous in view of the cost. On the other hand, if the particle size is larger than 100 μm, then hard portions, which result from the particles, are intermittently formed in the cladded portion 14, and the hard portions are continued to soft portions resulting from the matrix. Therefore, for example, when the cutting machining is performed for the cladded portion 14, vibration occurs on the blade tool.

Assuming that the area of an arbitrary cross section of the cladded portion 14 is 100, the area occupied by the particles is 10 to 20%.

In the case of a general particle dispersion copper alloy in which the Co alloy particles are dispersed in the Cu self-fluxing alloy as described above, the average particle diameter of the particles is about 300 μm, the particle size distribution width is large, and the particles are dispersed unevenly. The occupied area of the particles in an arbitrary cross section is typically about 13%. However, when the cross section differs, the value differs as well. The value may be less than 10% or above 20%. That is, even in the case of the same particle dispersion copper alloy, the occupied area of the particles differs depending on the cross section, and varies widely.

As clearly appreciated from the above, in the case of the particle dispersion copper alloy according to the embodiment of the present invention, the hard phase particles are dispersed substantially uniformly. Further, the average particle diameter and the particle size distribution width of the hard phase particles are remarkably small as compared with the general particle dispersion copper alloy. Further, the occupied area of the particles in an arbitrary cross section is within the constant range. Therefore, the remarkably excellent abrasion resistance is expressed substantially uniformly irrelevant to the portions in the particle dispersion copper alloy according to the embodiment of the present invention, i.e., in the cladded portion 14.

The cladded portion 14 can be provided as follows.

At first, an Al alloy member 10 is prepared. When a member having a complicated shape such as a cylinder head is used as the Al alloy member 10, it may be formed, for example, by casting.

A powder to be a matrix (Cu alloy), i.e., a Cu alloy powder containing 6 to 12% by weight of Ni, 2 to 5% by weight of Si, 1 to 10% by weight of at least any one of Cr and Mo, 2 to 10% by weight of Co, 0.3 to 1% by weight of Al, 0.3 to 1.2% by weight of P, 0.5 to 1.5% by weight of Fe, and inevitable impurities and Cu as balance is prepared, for example, by the atomize method. In this case, hardness of the matrix is improved owing to the presence of Al, and the self-fluxing property is satisfactory as well. Owing to the presence of P, the metal surface is reduced when the atomize method is carried out, the melting point of the oxide is lowered to reduce viscosity of the molten metal, and atomize powder is obtained with ease. Further, P also functions as a self-fluxing element.

The powder of the Cu alloy is prepared while keeping the particle size distribution width within the range of 10 to 150 μm. If the particle size distribution width is less than 10 μm, the energy amount is decreased when the laser is transmitted through the powder as described later on. As a result, the amount of heat transmitted to the Al alloy member 10 is decreased. Therefore, the deposition onto the Al alloy member 10 is difficult to advance. On the other hand, if the particle size distribution width is larger than 150 μm, because grain growth of the hard phase particles is excessively advanced, the average particle diameter and the particle size distribution width of the hard phase particles are increased.

On the other hand, a powder of the Co alloy to be the hard phase particles is prepared. That is, a mixed powder of 20 to 35% by weight of at least any one of Cr and Mo, 1 to 3% by weight of Ni, 1 to 2.5% by weight of Si, 3 to 8% by weight of W, 1 to 3% by weight of Fe, 0.8 to 2% by weight of C, and inevitable impurities and Co as balance is prepared and then the atomize method in the same manner as the Cu alloy powder is carried out with thus prepared mixed powder to obtain Co alloy powder.

The Co alloy powder is prepared while keeping the particle size distribution width is 10 to 100 μm. If the particle size distribution width is less than 10 μm, then laser is hardly transmitted through the powder as described later on, and hence it is difficult to melt the powder. Therefore, the deposition onto the Al alloy member 10 is hardly advanced. On the other hand, if the particle size distribution width is larger than 100 μm, grain growth of the hard phase particles is excessively advanced. Consequently, the average particle diameter and the particle size distribution width of the hard phase particles are increased.

Subsequently, the Co alloy powder and the Cu alloy powder obtained as described above are mixed with each other to prepare a mixed powder. In this procedure, the mixing ratio is (Co alloy powder):(Cu alloy powder)=1 to 15:99 to 85 in weight ratio. With the ratio as described above, the cladded portion 14 is formed, which contains 6 to 15% by weight of Co, 3 to 8% by weight of at least any one of Cr and Mo, 0.3 to 1% by weight of W, 0.5 to 1.8% by weight of Fe, 8 to 15% by weight of Ni, 0.08 to 0.2% by weight of C, 1.5 to 4% by weight of Si, 0.5 to 0.8% by weight of Al, 0.1 to 0.3% by weight of P, and inevitable impurities and Cu as balance.

Subsequently, the mixed powder is charged into the depressed portion 12 of the Al alloy member 10, and then heated by laser or plasma.

Because the particle size of the mixed powder is prescribed as described above, laser is transmitted through the mixed powder with ease. Accordingly, the mixed powder is sufficiently heated. Consequently, it is melted and deposited on the Al alloy member 10 to form the cladded portion 14. The cladded portion 14 is prevented from hair cracks, because of the components and the composition ratios of the mixed powder prescribed above.

In the cladded portion 14, the hard phase particles, in which the average particle diameter is 8 to 20 μm and the particle size distribution width is 0.1 to 100 μm, are dispersed substantially uniformly during the process of deposition. Further, the carbides formed of Cr and C in the Co alloy and the silicides resulting from the source of Si are deposited. Further, the area ratio of the hard phase particles in an arbitrary cross section is 10 to 20%.

When the hard phase particles are dispersed substantially uniformly as described above, the cladded portion 14 has high hardness substantially uniformly throughout the cladded portion. Further, because the area ratio of the hard phase particles is large, abrasion resistance is increased and oxidation resistance is excellent, resulting in remarkably decreased abrasion even at a high temperature.

The particle dispersion copper alloy of this type is preferably usable as a material for a member such as a valve seat which requires abrasion resistance.

In the embodiment described above, although the particle dispersion copper alloy is formed on the depressed portion 12 of the Al alloy member 10, it is not limited thereto, but may be formed on any other metal member.

It is not necessary to provide the particle dispersion copper alloy as the cladded portion 14 on the metal member.

Examples 1 to 3

A powder of a Cu self-fluxing alloy, which contained 8 to 10% by weight of Ni, 2.5 to 3.5% by weight of Si, 4 to 5% by weight of Cr, 2 to 3% by weight of Co, 0.5 to 1% by weight of Mo, 0.5 to 0.9% by weight of Al, 0.7 to 1.2% by weight of Fe, and inevitable impurities and Cu as balance, was prepared by the atomize method while keeping the particle size distribution in the range of 10 to 150 μm.

On the other hand, a powder of a Co alloy, which contained 23 to 28% by weight of Cr, 1.5 to 2% by weight of Ni, 2 to 2.3% by weight of Si, 3.5 to 4.5% by weight of W, 1.2 to 1.5% by weight of Fe, 0.8 to 1.2% by weight of Mo, 1.4 to 1.6% by weight of C, and inevitable impurities and Co as balance, was prepared by means of the atomize method while keeping the particle size distribution in the range of 10 to 100 μm.

The powder of the Cu self-fluxing alloy powder and the powder of the Co alloy as described above were mixed at weight ratios of (Cu self-fluxing alloy powder):(Co alloy)= 95:5, 90:10 and 85:15 to obtain three types of mixed powders.

Each of the mixed powders was individually deposited on the depressed portion 12 provided in the vicinity of the opening of the through-hole 16 of the Al alloy member 10 to provide the cladded portion 14 having a thickness of 2.5 mm. Obtained samples are designated as Examples 1 to 3 respectively.

Figure 2:
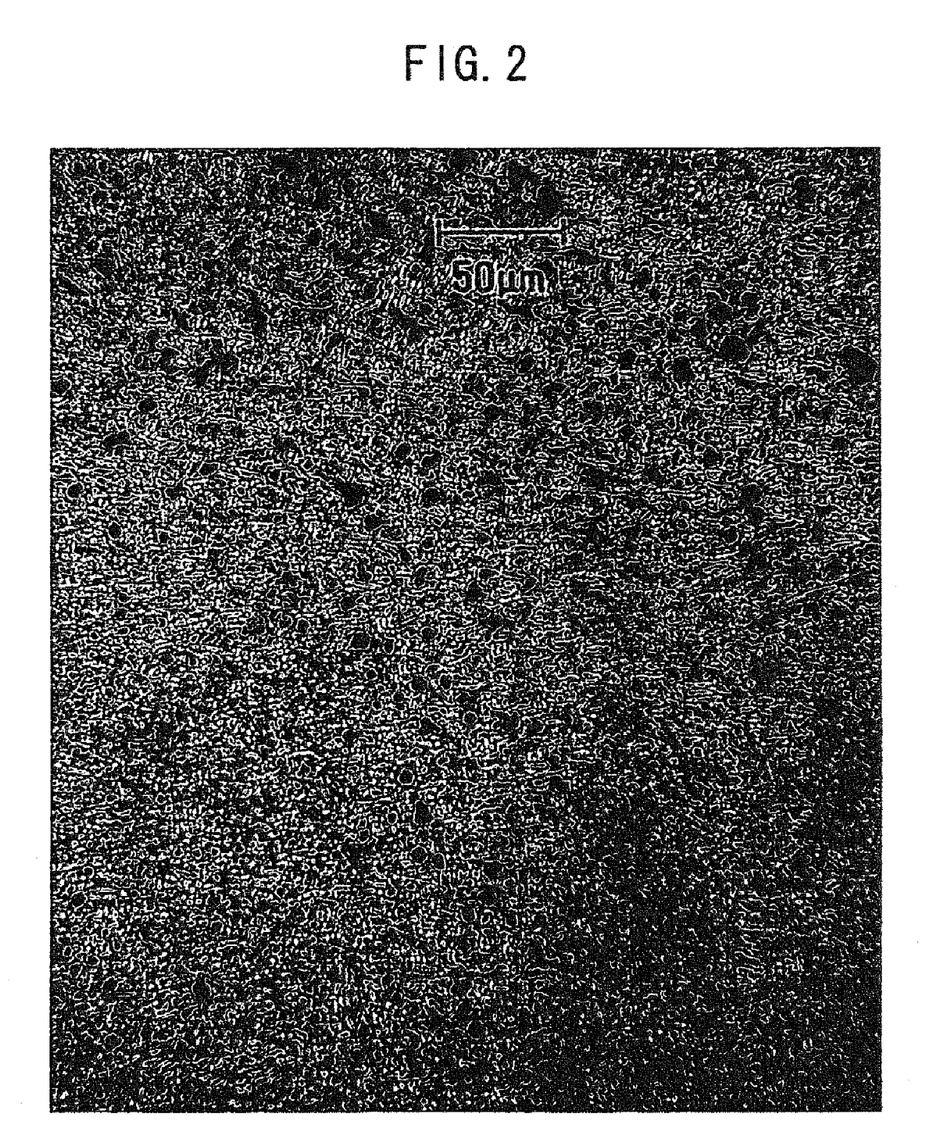
FIG. 2 is an SEM photograph illustrating a cladded portion of Example 1.

Arbitrary cross sections of the cladded portions 14 of Examples 1 to 3 are obtained by an electron microscope (SEM). FIG. 2 shows an SEM photograph of the cladded portion 14 of Example 1. Substantially circular areas visually recognized in FIG. 2 are deposited hard phase particles. As a result of the SEM observation, the average particle diameter of the hard phase particles was 10 μm, and the particle size distribution width was 0.1 to 100 μm for all of the cladded portions 14.

The area ratios occupied by the hard phase particles, which were determined by the binary value conversion for arbitrary cross sections of the respective cladded portions 14, were 10.6%, 15.2%, and 19.1% respectively.

Figure 3:
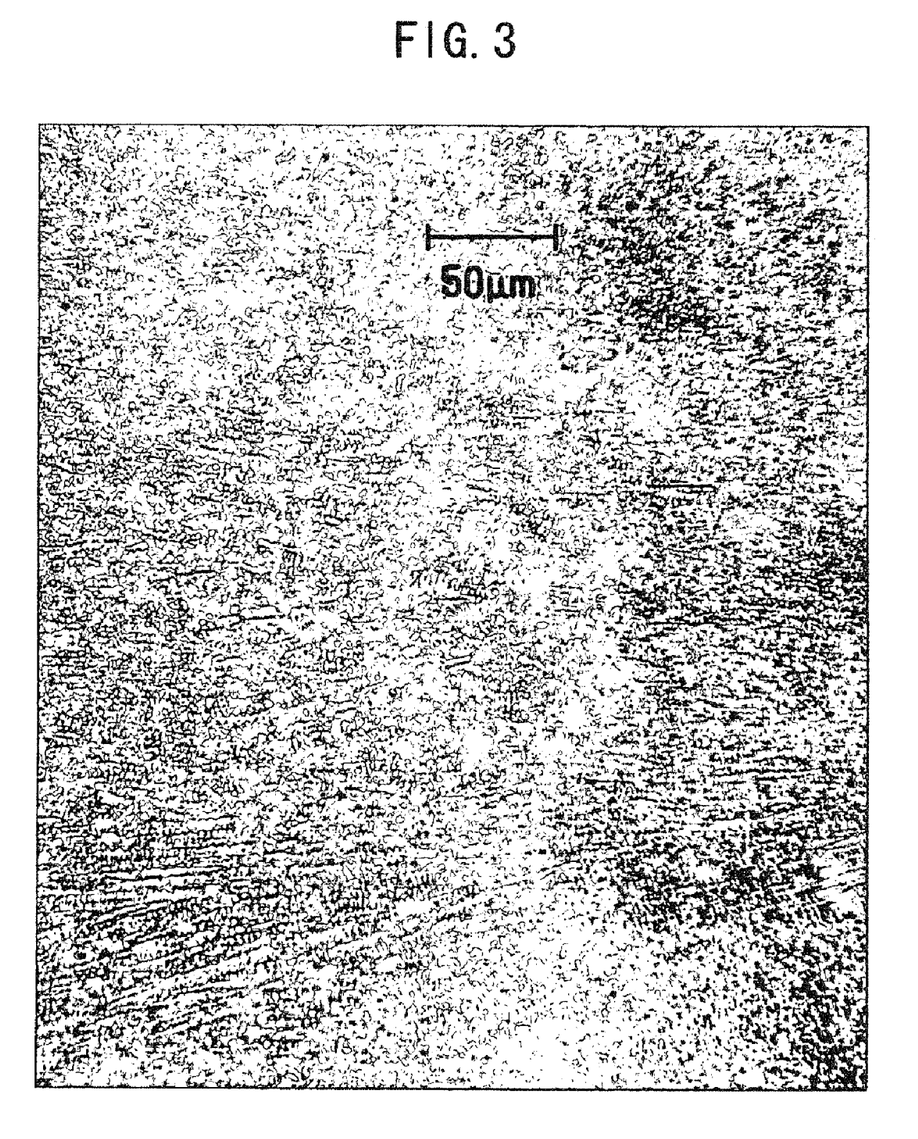
FIG. 3 is an SEM photograph illustrating a cladded portion of Comparative Example 1.

For comparison, a cladded portion was provided by using only the Cu self-fluxing alloy. This sample was designated as Comparative Example 1. An SEM photograph thereof is shown in FIG. 3. As clearly appreciated from FIG. 3, the presence of the deposited particles is scarcely recognized in the cladded portion composed only of the Cu self-fluxing alloy.

About 10% by weight of the Co alloy was added to the Cu self-fluxing alloy to form an alloy by the atomize method. This alloy powder was used to provide a cladded portion. This sample is designated as Comparative Example 2.

In Comparative Example 2, the average particle diameter was extremely large, i.e., 300 μm, and the particle size distribution width was large as well, although the dispersion of the hard phase particles was recognized. Further, the area ratio of the hard phase in an arbitrary cross section was 13% in average, but greatly different depending on the cross section. This means that dispersion of the hard phase particles is uneven.

An abrasion resistance test was carried out for the respective cladded portions of Examples 1 and 2 and Comparative Examples 1 and 2 described above. That is, a valve, which was connected to a cam shaft, was inserted into the through-hole 16 of the Al alloy member 10. The valve moved forward/backward by rotating the cam shaft while heating the valve and the cladded portion with a gas burner, to make sliding contact between the valve and the cladded portion. The burner was combusted at the theoretical air-fuel ratio (14.7), and the cam shaft was rotated at 3,000 rpm. As a result, the amounts of abrasion were 140 μm and 70 μm in Comparative Examples 1 and 2. On the contrary, the amounts of abrasion were extremely small, i.e., 45 μm and 30 μm in Examples 1 and 2.

As is clear from the results, the particle dispersion copper alloy, which is excellent in abrasion resistance, is obtained by using mixed powder of the Cu alloy powder and the Co alloy powder having the predetermined particle sizes.

Although certain preferred embodiments of the present invention have been shown and described in detail, it should be understood that various changes and modifications may be made therein without departing from the scope of the appended claims.

What is claimed is:

1. A method for producing a particle dispersion copper alloy comprising particles dispersed in a matrix composed of a copper alloy, wherein an area ratio occupied by said particles in an arbitrary cross section is 10 to 20%; said method comprising the steps of:

preparing a mixed powder by mixing a Cu alloy powder and a Co alloy powder at a weight ratio between said Cu alloy powder and said Co alloy powder as 99 to 85:1 to 15, said Cu alloy powder having a particle size of 10 to 150 μm and containing 6 to 12% by weight of Ni, 2 to 5% by weight of Si, 1 to 10% by weight of at least any one of Cr and Mo, 2 to 10% by weight of Co, 0.3 to 1% by weight of Al, 0.3 to 1.2% by weight of P, 0.5 to 1.5% by weight of Fe, and inevitable impurities and Cu as balance, and said Co alloy powder having a particle size of 10 to 150 μm and containing 20 to 35% by weight of at least any one of Cr and Mo, 1 to 3% by weight of Ni, 1 to 2.5% by weight of Si, 3 to 8% by weight of W, 1 to 3% by weight of Fe, 0.8 to 2% by weight of C, and inevitable impurities and Co as balance to prepare a mixed powder; and heating said mixed powder by laser or plasma to prepare said particle dispersion copper alloy.

2. The method for producing said particle dispersion copper alloy according to claim 1, wherein said mixed powder is heated on a metal member to obtain said particle dispersion copper alloy in a state of being jointed to said metal member.

3. The method for producing said particle dispersion copper alloy according to claim 2, wherein a member made of Al alloy is used as said metal member.

4. The method for producing said particle dispersion copper alloy according to claim 2, wherein said particle dispersion copper alloy is manufactured as a valve seat which is provided at an opening of said metal member and which makes sliding contact with a valve.

5. The method for producing said particle dispersion copper alloy according to claim 1, wherein said Cu alloy powder and said Co alloy powder are individually prepared by an atomize method respectively, and then said Cu alloy powder and said Co alloy powder are mixed with each other.

6. The method for producing said particle dispersion copper alloy according to claim 1, wherein Co alloy particles, carbide alloy particles, and silicide particles are generated as said particles.

* * * * *

UNITED STATES PATENT AND TRADEMARK OFFICE
CERTIFICATE OF CORRECTION

| | |
|---|---|
| PATENT NO. | : 7,811,511 B2 |
| APPLICATION NO. | : 12/650647 |
| DATED | : October 12, 2010 |
| INVENTOR(S) | : Shogo Matsuki et al. |

It is certified that error appears in the above-identified patent and that said Letters Patent is hereby corrected as shown below:

On the Title Page:

In Item (73)     Assignee, please correct the Assignee to read as follows:

(73)     Honda Motor Co., Ltd.

Signed and Sealed this
Eighth Day of February, 2011

David J. Kappos
*Director of the United States Patent and Trademark Office*